US 6,726,328 B2

(12) United States Patent
Lee

(10) Patent No.: US 6,726,328 B2
(45) Date of Patent: Apr. 27, 2004

(54) THIN PROJECTOR

(75) Inventor: Seung Gyu Lee, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/029,287

(22) Filed: Dec. 28, 2001

(65) Prior Publication Data
US 2002/0085177 A1 Jul. 4, 2002

(30) Foreign Application Priority Data
Dec. 28, 2000 (KR) .......................... 2000-84711

(51) Int. Cl.[7] .................. G03B 21/14; G03B 21/20; G02F 1/1335; G02B 27/28; G02B 5/30
(52) U.S. Cl. .................. 353/20; 353/84; 353/102; 349/9; 359/496
(58) Field of Search .................. 353/20, 30, 31, 353/34, 37, 82, 84, 102; 349/5, 7, 8, 9; 359/496, 616

(56) References Cited

U.S. PATENT DOCUMENTS

| 5,764,412 A | * | 6/1998 | Suzuki et al. ............... 359/487 |
| 6,139,156 A | | 10/2000 | Okamori et al. ............ 353/98 |
| 6,144,420 A | * | 11/2000 | Jung .............................. 349/8 |
| 6,273,569 B1 | * | 8/2001 | Iechika et al. ............... 353/38 |
| 6,343,862 B1 | * | 2/2002 | Sawai et al. .................. 353/1 |
| 6,373,630 B1 | * | 4/2002 | Lee et al. ..................... 359/495 |
| 6,445,500 B1 | * | 9/2002 | Itoh .............................. 359/487 |
| 2002/0060779 A1 | * | 5/2002 | Furuhata et al. ............. 353/31 |
| 2002/0085179 A1 | * | 7/2002 | Lee .............................. 353/84 |
| 2002/0085180 A1 | * | 7/2002 | Lee .............................. 353/84 |
| 2002/0180933 A1 | * | 12/2002 | Ito ............................... 353/20 |

FOREIGN PATENT DOCUMENTS

CN          97190776.5      10/1998     ........... G02B/27/28

* cited by examiner

Primary Examiner—Russell Adams
Assistant Examiner—Melissa J. Koval
(74) Attorney, Agent, or Firm—Fleshner & Kim, LLP

(57) ABSTRACT

Projector is suggested, including a light source for emitting beams of lights, a rod lens for receiving the beams of lights from the light source for making a distribution of the beams uniform, and a polarization beam converter. The polarization beam converter has a lens part for receiving the beams from the rod lens and focusing onto a plurality of focusing points, and a polarization beam split array. The polarization beam split array receives the beams inclusive of a P wave and an S wave, and forwards the P wave as it is, and converting the P wave into the S wave before forwarding. The employment of the rod lens permits to fabricate a thinner polarization converter, and minimizes a light loss.

12 Claims, 9 Drawing Sheets

15 beam distribution        beam distribution

○ focused parts

↕ P wave
· S wave

↕ P wave
• S wave

THIN PROJECTOR

This application claims the benefit of the Korean Application No. P2000-84717 filed on Dec. 28, 2000, which is hereby incorporated by reference.

BACKGROUND OF THE INVENTION

1. Field of the Invention

The present invention relates to a projector.

2. Background of the Related Art

The projector enlarges, and projects a small picture on a small display inside of the projector by using a projection lens system to a large sized screen, to display a large sized picture. There are a front projection type in which the picture is displayed on a front face of the screen, and a rear projection type in which the picture is displayed on a rear face of the screen. As a typical one of the latter, there is the projection television. As the small display in the projector that displays the small picture, LCD (Liquid Crystal Display) and DMD (Digital Micromirror Device), and the like are employed. The LCD is provided with a polarization beam converter as shown in FIGS. 1A and 1B for displaying the picture by using a linearly polarized light.

In order to fabricate a small sized projector, and enhance a visibility of the large picture displayed on the large sized screen, it is required to fabricate the polarization beam converter thinner, as well as minimize an optical loss of the polarization beam converter.

FIGS. 1A and 1B illustrate related art polarization beam converters, FIG. 2 illustrates operation of the polarization beam split array in FIG. 1A, FIGS. 3A and 3B illustrate details of the polarization beam sprite array in FIG. 1A, FIG. 4 illustrates a light source with a parabolic reflector, FIG. 5 illustrates a light source with an elliptic reflector, and FIG. 6 illustrates a beam distribution of beams focused by the lens array in FIG. 1A.

Referring to FIGS. 1A and 1B, the related art polarization beam converter is provided with a first lens array 2, a second lens array 4, and a polarization beam split array 6 facing an optical output surface of the second lens array 4.

The first lens array 2, or the second lens array 4 focuses white beams of lights inclusive of P wave and S wave onto a plurality of focusing points. As shown in FIG. 6, light beams 15 pass through the lens array shown in FIG. 1A. To do this, the first, or second lens array 2, or 4 has a matrix of a plurality of lenses.

In the meantime, the polarization beam split array 6 transmits an 'S' wave, and converts a 'P' wave into 'S' wave and transmits the converted 'S' wave among the beams from the second lens array 4. To do this, the polarization beam split array 6 has polarization beam split planes 10 and polarization beam reflection planes 12, both sloped with respect to an optical input surface and an optical output surface as shown in FIG. 2, and half wavelength plates 8 attached to the optical output surface.

The polarization beam, split plane 10 only transmits the P wave and reflects the S wave among the white beams of lights from the second lens array 4. The P wave passed through the polarization beam, split plane 10 is converted into an S wave by the half wavelength plate 8. On the other hand, the S wave reflected at the polarization beam split plane 10 is reflected at the reflection plane 12.

That is, the entire beams of lights inclusive of the P wave and the S wave passed through the polarization beam split array 6 are converted into the S wave. The polarization beam split array 6 has two parts to be symmetric with respect to a center art 14 thereof as shown in FIG. 3A.

Referring to FIGS. 3A and 3B, the white beams of lights incident on the first lens array 2 from the light source (not shown) are incident on the first lens array in parallel to one another. To do this, the related art polarization beam converter employs a lamp 18 with a parabolic reflector 16. However, even the white beams from the lamp 18 with the parabolic reflector 18 include non-parallel beams. As shown in FIG. 3B, the second lens array 4 serves to compensate for a loss caused by the non-parallel beams.

The lamp 18 with the parabolic reflector 16 has an optical efficiency poorer than a lamp 20 with an elliptic reflector 22 shown in FIG. 5.

It will be explained in detail, assuming that a diameter of the parabolic reflector 16 is Dp and a diameter of the elliptic reflector is De. The lamp 18 with the parabolic reflector 16 directs the beams of lights forward in parallel, i.e., the parabolic reflector 16 is required to have a slope for directing the beam from the lamp 18 forward in parallel.

On the other hand, the lamp 20 with an elliptic reflector 22 directs the beams of lights such that the beams are focused at a plane in front of the lamp 20. Accordingly, the elliptic reflector 22 is required to have a slope greater than the parabolic reflector 16 so that the beams from the lamp 20 are focused on the plane in front of the lamp 20. That is, because the lamp 20 with the elliptic reflector 22 can reflect more beams, the lamp 20 with the elliptic reflector 22 has an optical efficiency higher than the lamp 18 with the parabolic reflector 16.

If the lamp 20 with the elliptic reflector 22 and the lamp 18 with the parabolic reflector 16 have the same optical efficiency, the diameter of the elliptic reflector 22 can be made smaller than the parabolic reflector 16, to reduce a size of the elliptic reflector 22. However, since the related art projector requires parallel beams, the lamp 20 with the elliptic reflector 22 can not be employed therein. Therefore, the related art projector has a limitation in fabricating a thinner projector.

Moreover, there are no beams incident on a center part of the related art polarization beam split array 6. That is, the beams from the first lens array 2 and the second lens array 4 are incident on the polarization beam split array 6 in symmetry with respect to a center part 14 thereof. Consequently, no beams pass through the center part 14 of the related art polarization beam split array 6. Accordingly, there has been a problem in that a uniformity of the beams becomes poorer even if a position of the polarization beam split array 6 is changed, slightly.

Furthermore, the related art polarization converter is provided with lens arrays having a plurality of lenses. There are optical losses between the plurality of lenses of the lens arrays. However, if the number of the lenses provided in the lens array is reduced, a production cost of the projector increases because a thickness of the polarization converter relatively increases. Particularly, since alignment of the lens arrays influences to an optical conversion efficiency significantly, much time is required for an accurate assembly.

In addition to this, because the related art projector uses parallel beams, the beams are not focused at one point. Therefore, in order to employ only one sheet of display (i.e., for providing a color wheel), a first optical system for focusing the beams, and a second optical system for diverging the focused beams again are required, additionally. Accordingly, the fabrication of a thinner projector has been difficult in the related art.

SUMMARY OF THE INVENTION

Accordingly, the present invention is directed to a projector that substantially obviates one or more of the problems due to limitations and disadvantages of the related art.

An object of the present invention is to provide a projector which permits fabrication of a thinner projector.

Another object of the present invention is to provide a projector which can minimize an optical loss.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the projector employs a rod lens for making a distribution of incident beams uniform. The employment of the rod lens permits to employ a lamp with an elliptic reflector that allows fabrication of a thin projector.

In another aspect of the present invention, there is provided a projector including a light source for emitting beams of lights, a rod lens for receiving the beams of lights from the light source and making a distribution of the beams uniform, and a polarization beam converter for receiving the beams from the rod lens. The polarization beam converter has a lens part for receiving the beams from the rod lens and focusing onto a plurality of focusing points, and a polarization beam split array receives the beams inclusive of a P wave and an S wave, and forwards the P wave as it is, and converting the P wave into the S wave before forwarding.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings FIGS. 7A–10.

Figure 7A:
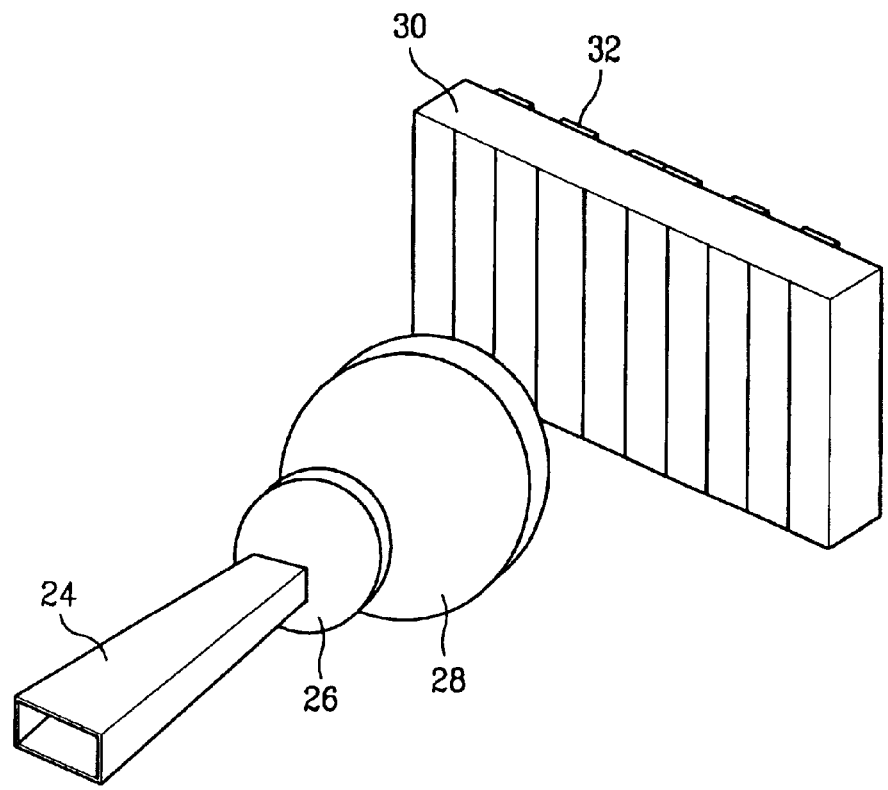
FIGS. 7A and 7B illustrate polarization beam converters in accordance with a preferred embodiment of the present invention.
Figure 7B:
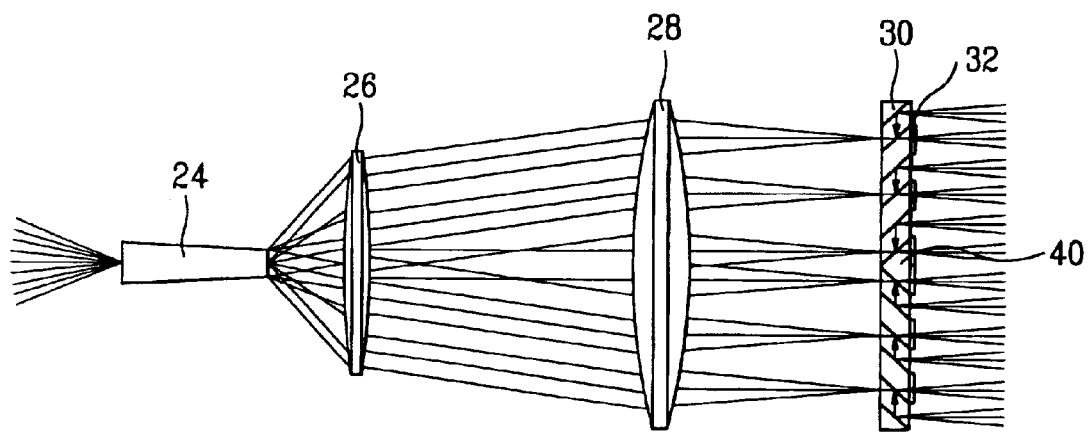
Figure 8:
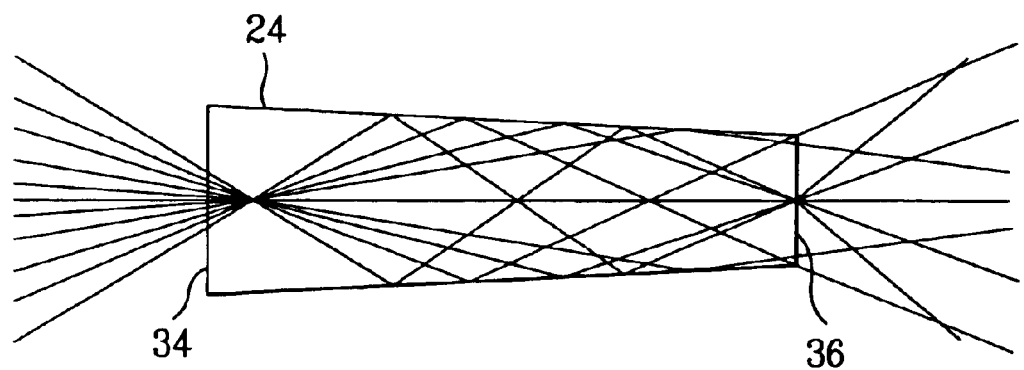
FIG. 8 illustrates a detail of operation of the rod lens shown in FIG. 7A.
Figure 8:
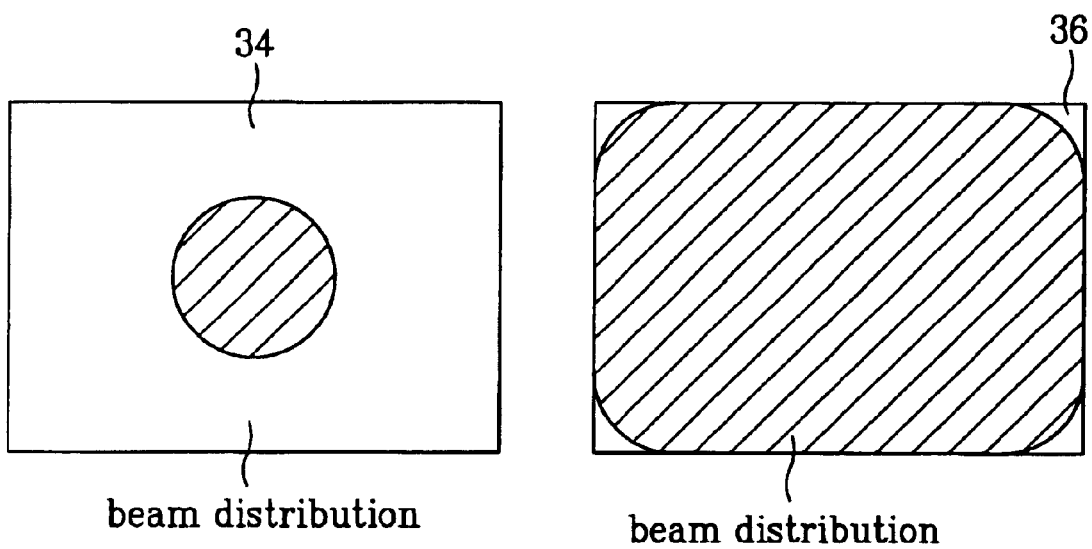
Figure 9:
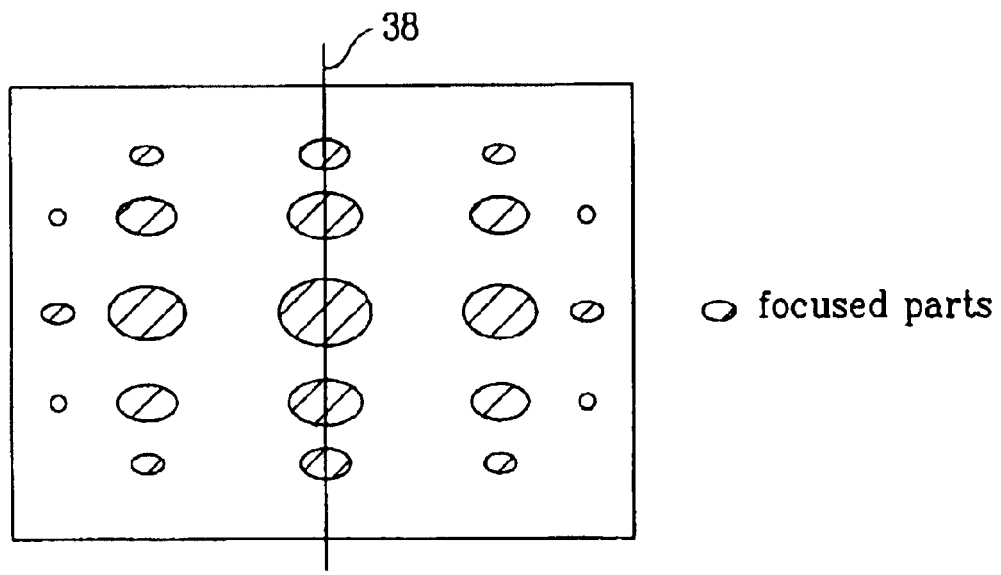
FIG. 9 illustrates distribution of beams focused by the illumination lenses in FIG. 7A.
Figure 10:
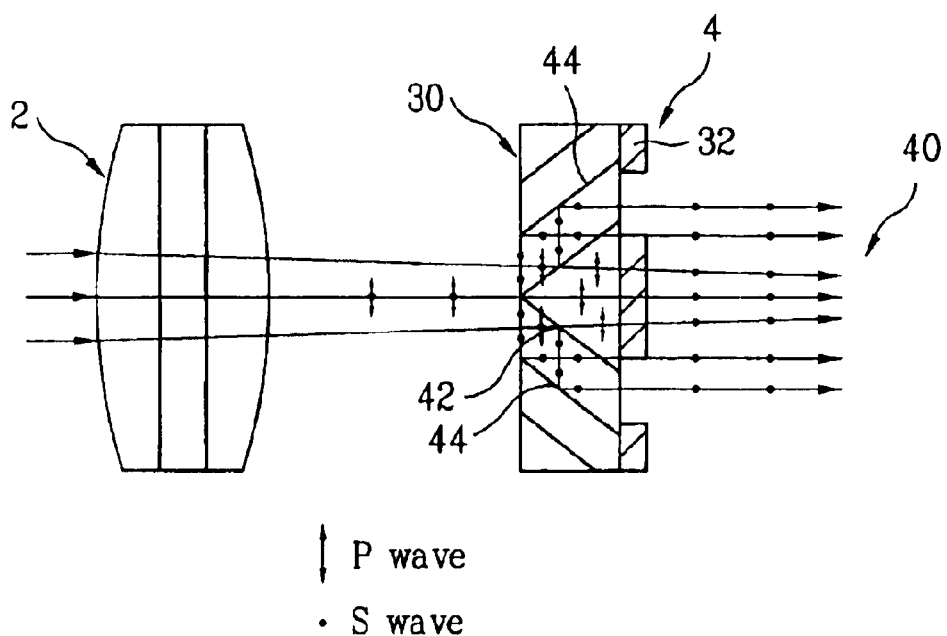
FIG. 10 illustrates a detail of operation of the polarization beam split array in FIG. 7A; and, FIG. 11 illustrates a diagram of an optical system in which a polarization beam converter is arranged to provide a P wave at a final stage.

FIGS. 7A and 7B illustrate polarization beam converters in accordance with a preferred embodiment of the present invention, FIG. 8 illustrates a detail of operation of the rod lens shown in FIG. 7A, FIG. 9 illustrates distribution of beams focused by the illumination lenses in FIG. 7A, and FIG. 10 illustrates a detail of operation of the polarization beam split array in FIG. 7A.

Referring to FIGS. 7A and 7B, the projector in accordance with a-preferred embodiment of the present invention includes a rod lens 24, a first illumination lens 26 and a second illumination lens 28 for focusing beams from the rod lens 24 at a particular location, and a polarization beam split array 30 facing an optical output surface of the second illumination lens 28. The first illumination lens 26, the second illumination lens 28, and the polarization beam split array 30 facing the optical output surface of the second illumination lens 28 compose a polarization beam converter.

In the unexplained reference symbols in FIGS. 7A and 7B, 32 denotes a reflection planes, 38 denotes center parts of the first illumination lens 26 and the second illumination lens 28, and 40 denotes a center part of the polarization beam split array 30.

The rod lens 24 makes distribution of the beams focused from a light source and incident thereon uniform. As shown in FIG. 8, the beams from the light source is focused onto an optical input surface 34 of the rod lens 24.

The beams incident on the incident surface of the rod lens 24 are totally reflected inside of the rod lens 24, that makes the distribution of beams uniform at an optical output surface of the rod lens 24.

In the meantime, referring to FIG. 9, beams incident on the polarization beam split array 30 are split into preset groups. To do this, the optical output surface 36 of the rod lens 24 is required to have an area equal to, or smaller than an area of the optical input surface 34. In other words, the following equation (1) should be satisfied:

$$\text{area of optical input surface} \geq \text{area of optical output surface} \quad (1)$$

When the optical output surface 36 of the rod lens 24 has an area smaller than the area of the optical input surface 34, a degree of optical split is improved. The beams from the rod lens 24 are focused onto a plurality of focus points as shown in FIG. 9 by the first illumination lens 26 and the second illumination lens 28.

Referring to FIG. 9, the beams from the first illumination lens 26 and the second illumination lens 28 are symmetric with respect to center parts 38 of the first illumination lens 26 and the second illumination lens 28, with large quantities of the beams concentrated on the center parts 38. Accordingly, the deterioration of the beam uniformity caused by fine movement of the first illumination lens 26, the second illumination lens 28, and/or the polarization beam split array 30 can be prevented.

In the meantime, since the beams from the second illumination lens 28 are incident on the center part 40 of the polarization beam split array 30, the center part 40 of the polarization beam split array 30 has a configuration as shown in FIG. 10.

Referring to FIG. 10, the center part 40 of the polarization beam split array 30 has polarization beam split planes 42 and polarization beam reflection planes both sloped with respect to the optical input surface and the optical output surface of the polarization beam split array 30, and a half wavelength plate 32 attached to the optical output surface of the polarization beam split plane 42.

The polarization beam split array 30 is symmetric with respect to the center part 40, with two polarization beam, split planes 42 formming a triangular section in the center part 40. The polarization beam split planes 42 receives the white beams from the second illumination lens 28, and transmits only P wave and reflects S wave. The P wave transmitted the polarization beam split planes 42 is converted into the S wave by the half wavelength plate 32, and forwarded. On the other hand, the S wave reflected at the polarization split planes 42 is reflected at the reflection surface 44, and forwarded as it is. That is, all the white beams inclusive of the P wave and S wave passed through the polarization beam split array 30 are converted into S wave.

Figure 1A:
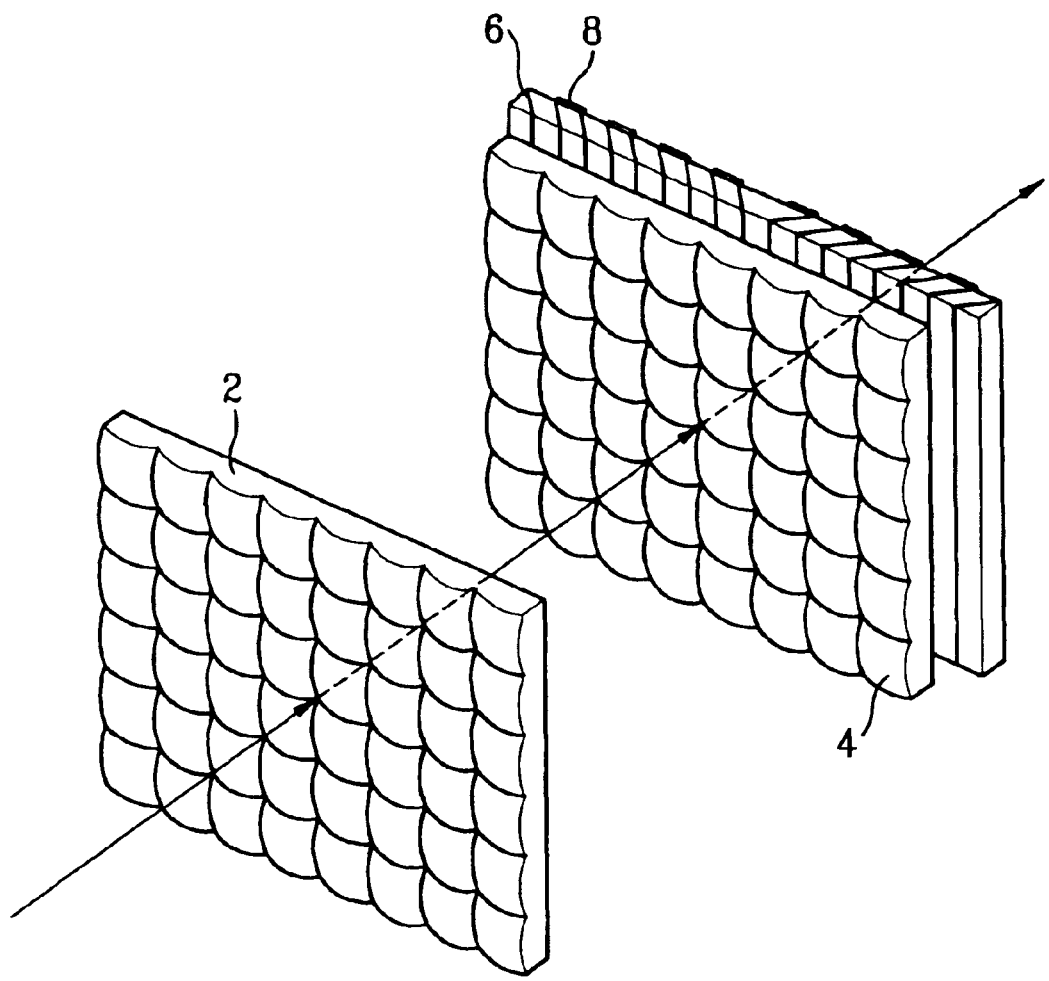
FIGS. 1A and 1B illustrate related art polarization beam converters.
Figure 1B:
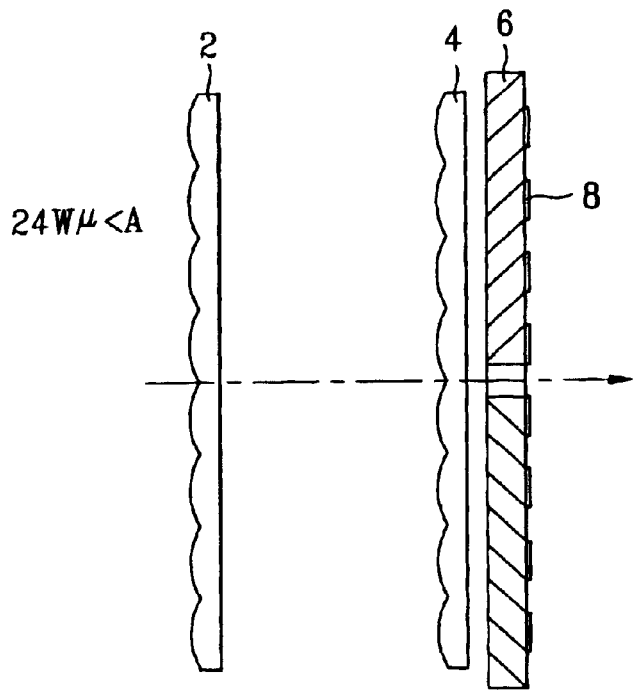
Figure 2:
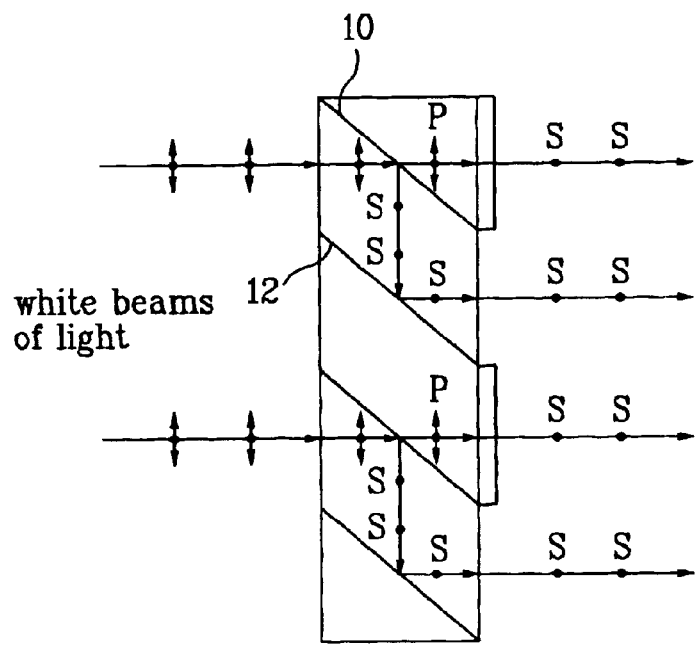
FIG. 2 illustrates operation of the polarization beam split array in FIG. 1A.
Figure 3A:
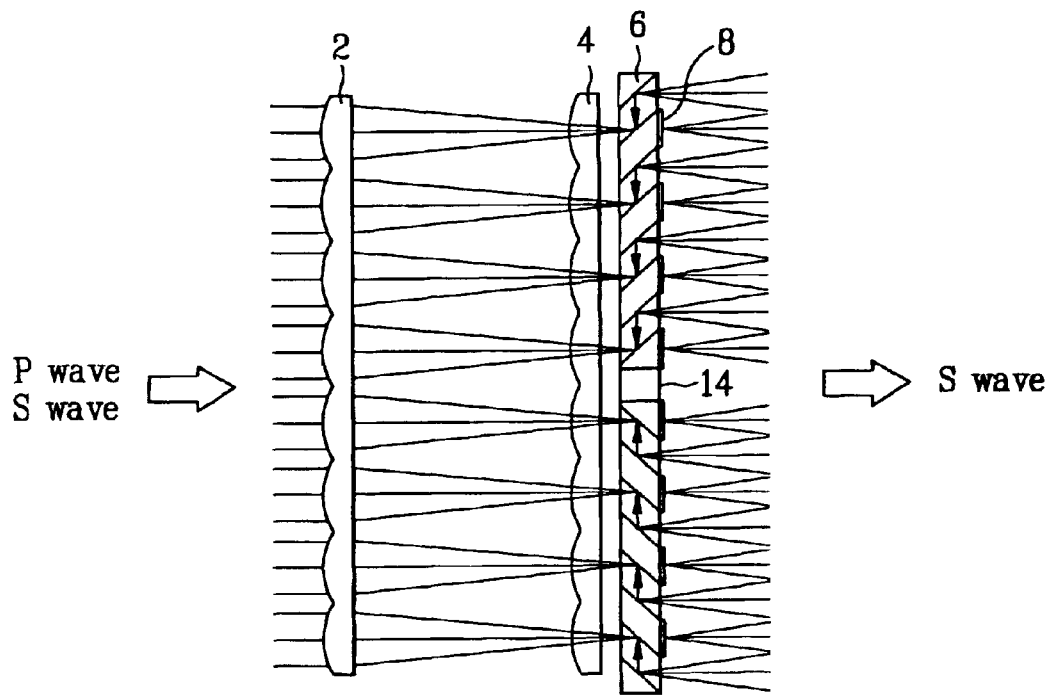
FIGS. 3A and 3B illustrate details of the polarization beam split array in FIG. 1A.
Figure 3B:
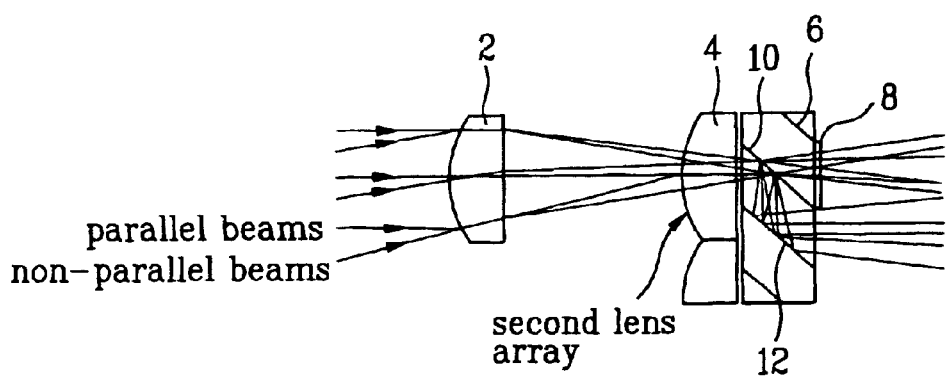
Figure 4:
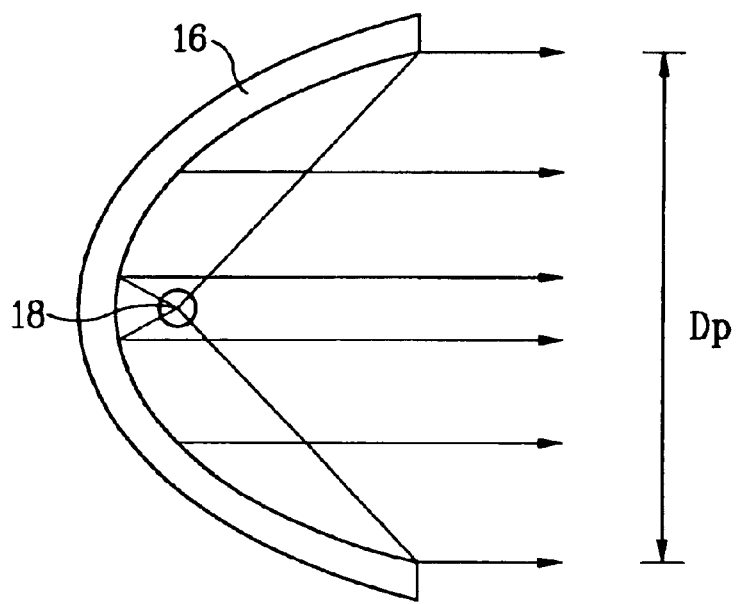
FIG. 4 illustrates a light source with a parabolic reflector.
Figure 5:
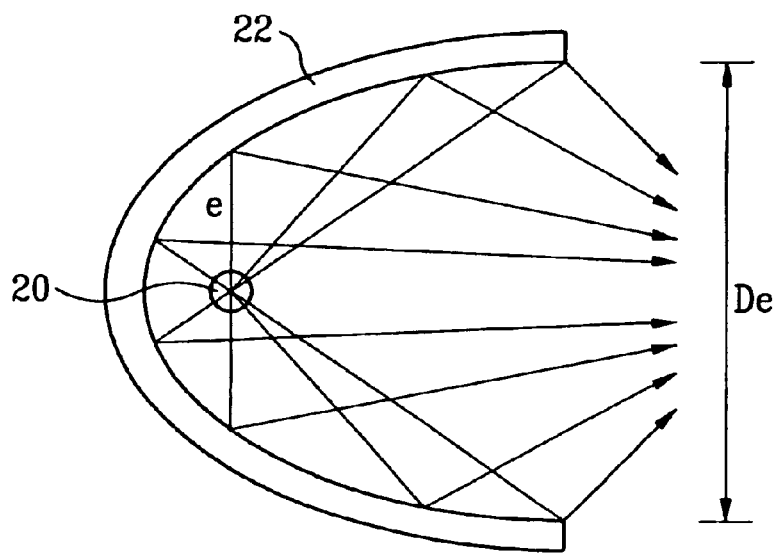
FIG. 5 illustrates a light source with an elliptic reflector.
Figure 6:
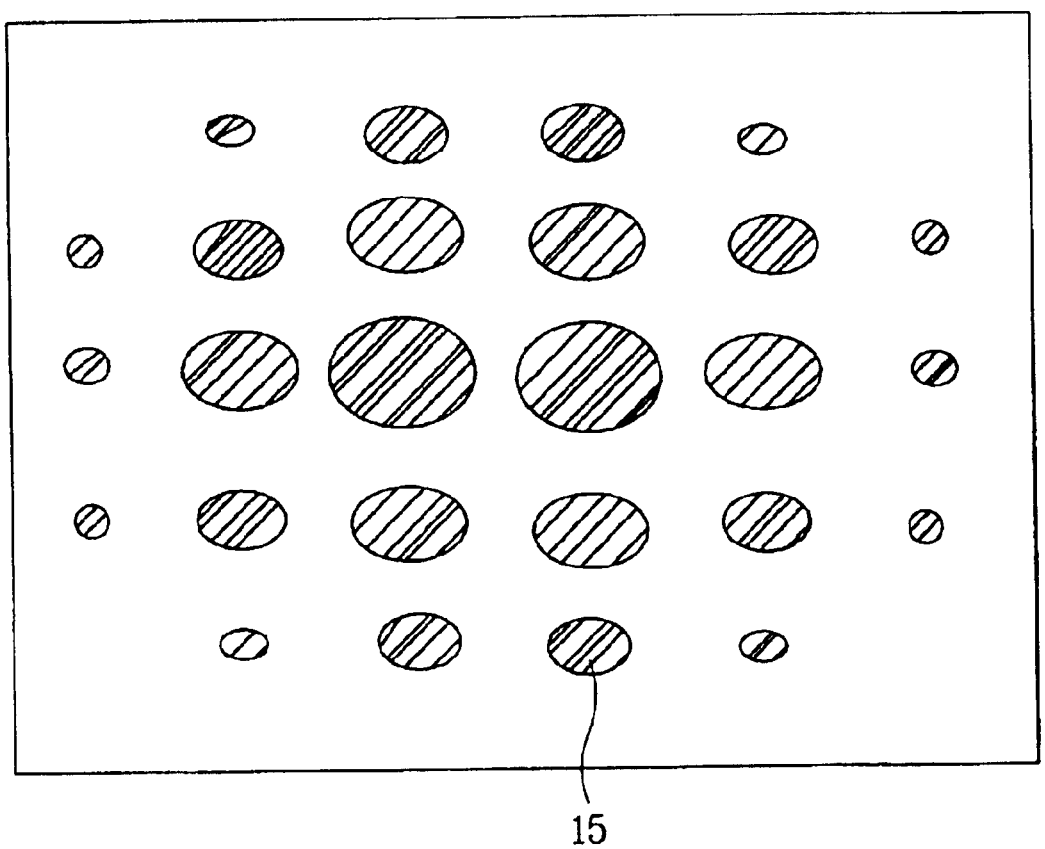
FIG. 6 illustrates a beam distribution of beams focused by the lens array in FIG. 1A.

As explained, the rod lens 24 in the projector in accordance with a preferred embodiment of the present invention requires focused beams incident thereon, the lamp 20 with elliptic reflector 22 shown in FIG. 5 may be employed. Therefore, the projector of the present invention has an optical efficiency higher than the projector having the lamp 18 with the parabolic reflector 16, and permits fabrication of a thinner projector.

Moreover, there may be a color wheel provided between the rod lens 24 and the light source additionally in the present invention. That is, without addition of an optical system, the color wheel may be provided in front of the rod lens 24 at which the beams are focused. Accordingly, the projector of the present invention permits to fabricate a thinner projector as there is no additional optical system.

Furthermore, the projector in accordance with a preferred embodiment of the present invention can prevent the light loss occurred at the related art lens array because the beams can be focused by using the first illumination lens 26 and the second illumination lens 28 without the lens array employed in the related art projector.

Figure 11:
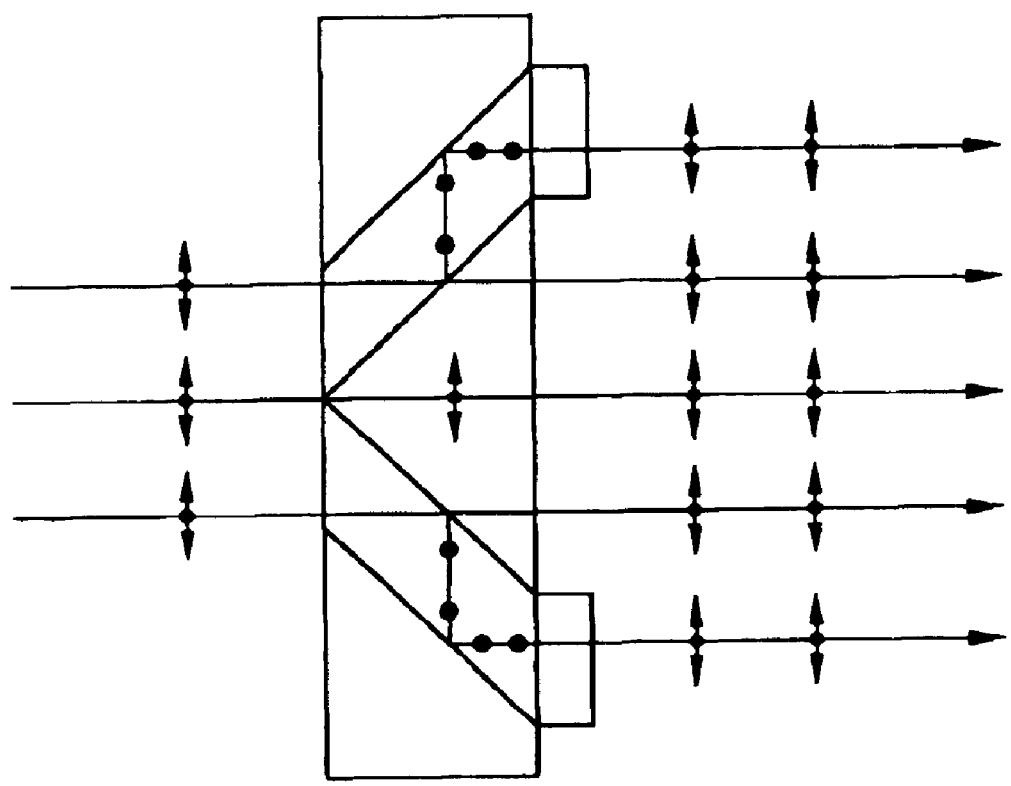

FIG. 11 illustrates a diagram of an optical system in which a polarization beam converter is arranged to provide a P wave at a final stage.

Referring to FIG. 11, half wavelength (λ/2) plates are fitted to parts of the polarization beam converter where the S waves split by the polarization beam converter 30 are provided, to provide P waves on the whole as the P waves transmitted through the polarization beam converter as they were proceed intact.

As has been explained, the projector of the present invention permits to fabricate a thinner projector because the lamp with the elliptic reflector can be employed in place of the lamp with the parabolic reflector in the related art. Also, the employment of the lamp with the elliptic reflector, a color wheel can be employed without addition of an optical system. The color wheel is fitted between the light source and the rod lens, for splitting at least on color beam from the beams. Also, the focusing of the beams only by using the illumination lens instead of the related art lens array onto the polarization beam split array minimizes the light loss.

It will be apparent to those skilled in the art that various modifications and variations can be made in the projector of the present invention without departing from the spirit or scope of the invention. Thus, it is intended that the present invention cover the modifications and variations of this invention provided they come within the scope of the appended claims and their equivalents.

What is claimed is:

1. A projector comprising:
   a light source for emitting beams of light;
   a rod lens for receiving the beams of lights from the light source for making a distribution of the beams uniform;
   a lens part for receiving the beams from the rod lens and focusing onto a plurality of focusing points; and
   a polarization beam split array including a plurality of polarization split planes and a plurality of optical output planes, wherein the polarization split planes are slanted to receive from the lens part P-wave and S-wave beams, and are configured to form a triangle with the optical output plane at a central part of the polarization beam split array so that two slanted polarization split planes are symmetrically facing each other in an opposite direction, and each of the optical output planes has a half wavelength plate to output polarized beams having the P-waves or the S-waves rotated 90 degrees.

2. A projector as claimed in claim 1, wherein the light source is a lamp with an elliptic reflector.

3. A projector as claimed in claim 1, wherein an optical input surface of the rod lens has an area equal to, or greater than an area of the optical output surface.

4. A projector as claimed in claim 1, wherein the lens part includes at least one illumination lens.

5. A projector as claimed in claim 1, farther comprising means between the light source and the rod lens for splitting at least one color beam from the beams of lights.

6. A projector as claimed in claim 5, wherein the means is a color wheel.

7. The projector as claimed in claim 1, wherein the polarization split planes transmit the P-wave beams and reflect the S-wave beams, and the half wavelength plates transform the transmitted P-wave beams into S-wave beams so as to polarize all the light beams into S-wave beams.

8. The projector as claimed in claim 1, wherein the polarization split planes transmit the P-wave beams and reflect the S-wave beams, and the half wavelength plates transform the reflected S-wave beams into P-wave beams so as to polarize all the light beams into P-wave beams.

9. The projector as claimed in claim 1, wherein two of the polarization split planes form a substantially continuous polarization splitting area around the central part.

10. The projector as claimed in claim 1, wherein the triangle is integrally formed between two polarization split planes and corresponding optical output planes.

11. The projector as claimed in claim 1, wherein two of the plurality of polarization split planes are substantially connected at the central part.

12. A projector, comprising:
    a light source for emitting beams of lights;
    an elliptical reflector for reflecting the beams of light toward a screen;
    a rod lens for receiving the reflected beams of light and making a distribution of the beams of light uniform;
    an illumination lens part for receiving the beams of light from the rod lens, diverging the beams of light, and focusing the beams of light onto a plurality of focusing points; and
    a polarization beam split array including polarization split planes respectively provided at the focusing points for receiving the beam of light including a P-wave and an S-wave from the illumination lens part and transmitting one of the waves as it is, and reflecting the other one of the waves, wherein a half wave plate is provided to each of the planes and one of the waves is transmitted therethrough for forwarding polarized beams of light in one direction, wherein the polarization split planes are slanted in opposite directions and meet at a center in symmetry in up/down directions to form a triangle with an optical output plane.

* * * * *